UNITED STATES PATENT OFFICE.

CARL OSCAR MÜLLER, OF BASLE, SWITZERLAND, ASSIGNOR TO BASLE CHEMICAL WORKS BINDSCHEDLER, OF SAME PLACE.

RHODAMIN DYE.

SPECIFICATION forming part of Letters Patent No. 578,578, dated March 9, 1897.

Application filed June 30, 1896. Serial No. 597,642. (Specimens.) Patented in France March 6, 1895, No. 245,593, and in England March 8, 1895, No. 4,985.

*To all whom it may concern:*

Be it known that I, CARL OSCAR MÜLLER, chemist, a subject of the Emperor of Germany, residing at Basle, Switzerland, have invented certain Improvements in the Manufacture of Rhodamin Dyes, (which have been patented in France by Letters Patent No. 245,593, dated March 6, 1895, and in England by Letters Patent No. 4,985, dated March 8, 1895,) of which the following is a clear and complete specification.

All the usual methods for preparing coloring-matters of the group of the phtaleins from anhydrous phtalic acid and metaämidophenols give only symmetrical rhodamin dyes. I have found that by the action of one molecule of a dialkylized metaämidophenol on one molecule of anhydrous phtalic acid new products of condensation (dialkylamidoöxybenzoylbenzoic acids) are obtained, which may be converted by their condensation with a further molecule of a metaämidophenol into unsymmetrical as well as symmetrical rhodamin dyes. These dialkylamidoöxybenzoylbenzoic acids, which have probably the following constitutional formula:

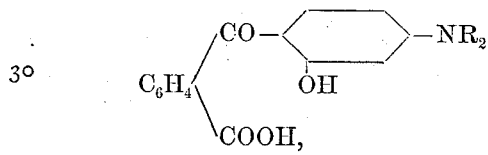

where R stands for an alkyl residue or alkyl group, are obtained either by heating for some time anhydrous phtalic acid with a dialkylized metaämidophenol in suitable indifferent solvents, as, for instance, benzene or toluene, or by melting the two components under such conditions that the formation of rhodamin does not take place, for instance, at a temperature of 100° to 110° centigrade.

By their combination with alkalies as well as with acids the dialkylamidoöxybenzoylbenzoic acids form salts which are soluble in water. By combining these acids with diazo derivatives coloring-matters are produced. On boiling with an alcohol and hydrochloric acid the new acids are converted into etherized bodies insoluble in carbonate of soda. The dialkylamidoöxybenzoylbenzoic acids dissolve in concentrated sulfuric acid with a yellow-orange coloration. On melting at a temperature of about 190° centigrade the new acids are decomposed and a phtalic symmetrical tetraälkyl rhodamin is formed. The dimethylamidoöxybenzoylbenzoic acid is more soluble in alcohol than the corresponding diethyl derivative. The dimethylamidoöxybenzoylbenzoic acid crystallizes in form of rhombic lamina, the corresponding ethyl derivative in form of long needles. Such a dialkylamidoöxybenzoylbenzoic acid can easily be transformed into rhodamin dyes by condensing it with metaämidophenols in concentrated sulfuric acid. The two components are dissolved in the said condensing agent and heated together.

By operating as described in the following examples extremely valuable dyes are obtained, which are not obtainable by the other till now known processes.

Example I: Thirty kilograms dimethylmetaämidophenol and thirty kilograms anhydrous phtalic acid are heated to 100° centigrade until the melted substance ceases to thicken. The product is then pulverized and dissolved in the necessary quantity of alcohol. The solution is filtered while hot, and to it is added a quantity of water until the warm liquid becomes slightly turbid. After cooling, the new dimethylamidoöxybenzoylbenzoic acid separates in rhombic lamina. Twenty-eight kilograms of the dimethylamidoöxybenzoylbenzoic acid thus obtained and fourteen kilograms metaämidocresol ($CH_3 : NH_2 : OH = 1:2:4$) are dissolved in a mixture of one hundred and eighty kilograms sulfuric acid of ninety-eight per cent. ($H_2SO_4$) and seventy kilograms water. The whole is heated to 140° to 160° centigrade, and when a test gives a clear solution in warm water it is poured into about eight hundred liters water and boiled, then filtered. The crystallized coloring-matter thus obtained is purified by recrystallization from water acidulated with hydrochloric acid.

The dyestuff obtained in form of a salt dissolves in water with a handsome red coloration, in alcohol with a yellowish fluorescence, which becomes more intense by addition of ammonia. The solution of the dyestuff in concentrated sulfuric acid has a yellow coloration, which turns to red by addition of water. It dyes with tannin and tartar emetic mordanted cotton in vividly-red tints.

The dyestuff-base has probably the following constitutional formula:

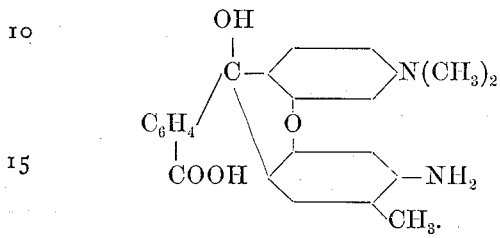

Example II: Fifteen kilograms anhydrous phtalic acid and seventeen kilograms diethyl-metaämidophenol are dissolved in seventy-five kilograms toluene. The solution is filtered when hot and heated during several hours to boiling-point. The diethylamido-oxybenzoylbenzoic acid separates in form of white needles, which are purified by recrystallization from alcohol. Thirty kilograms of this diethylamidoöxybenzoylbenzoic acid and seventeen kilograms metaämidocresol ($CH_3:NH_2:OH=1:2:4$) are heated with a mixture of one hundred and eighty kilograms sulfuric acid of about ninety-eight per cent. ($H_2SO_4$) and seventy-five liters of water at a temperature of 140° to 170° centigrade until a test gives a clear solution in water. The whole is then poured into about one thousand liters of water and boiled. After cooling, crystals separate, which are isolated by filtration and then suspended in water to which carbonate of sodium is added. The mass is then boiled and filtered. The residue is again suspended in water, and after thirty-five kilograms hydrochloric acid of thirty-three per cent. have been added to the mass it is boiled for some time. The separated crystals are filtered and dried. The thus-obtained new coloring-matter dyes with tannin and tartar emetic mordanted cotton in red tint.

What I claim as my invention, and wish to secure by Letters Patent, is—

1. The improvement in the manufacture of rhodamin dyes, consisting in the production of a coloring-matter by the condensation of one molecule of the dialkylamidoöxybenzoyl-benzoic acid, obtained by the action of one molecule anhydrous phtalic acid on one molecule dialkylmetaämidophenol, with one molecule of a metaämidophenol, as described.

2. The improvement in the manufacture of rhodamin dyes, consisting in the production of a coloring-matter by the condensation of one molecule of the dialkylamidoöxybenzoyl-benzoic acid, derived from one molecule anhydrous phtalic acid and one molecule dialkyl-metaämidophenol, with one molecule of meta-amidocresol ($CH_3:NH_2:OH=1:2:4$) as described.

3. The improvement in the manufacture of rhodamin dyes, consisting in the production of a coloring-matter by the condensation of one molecule of the dialkylamidoöxybenzoyl-benzoic acid, derived from one molecule anhydrous phtalic acid and one molecule dialkyl-metaämidophenol, with one molecule of meta-amidocresol ($CH_3:NH_2:OH=1:2:4$) and the subsequent conversion of the product of condensation thus obtained into salt by heating it in an acid.

4. As a new article of manufacture, the herein-described unsymmetrical dimethyl-methyl-rhodamin dye, derived from dimethyl-amidoöxybenzoylbenzoic acid and metaämi-docresol ($CH_3:NH_2:OH=1:2:4$) and dyeing with tannin and tartar emetic mordanted cotton in vividly-red tints, soluble in water with a red coloration, in alcohol with a yellowish fluorescence and in concentrated sulfuric acid with a yellow coloration turning to red on addition of water.

In witness whereof I have hereunto signed my name in the presence of two subscribing witnesses.

CARL OSCAR MÜLLER.

Witnesses:
 EMIL PARAVICINI,
 ARMAND RITTER.